(12) United States Patent
Si et al.

(10) Patent No.: US 8,965,883 B2
(45) Date of Patent: Feb. 24, 2015

(54) RANKING USER GENERATED WEB CONTENT

(75) Inventors: Xiance Si, Beijing (CN); Jian Gong Deng, Sunnyvale, CA (US); Huacheng Ke, Beijing (CN); Dong Zhang, Beijing (CN); Zoltan I. Gyongyi, Menlo Park, CA (US); Edward Y. Chang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 152 days.

(21) Appl. No.: 13/504,378

(22) PCT Filed: Oct. 29, 2009

(86) PCT No.: PCT/CN2009/001206
§ 371 (c)(1),
(2), (4) Date: Apr. 26, 2012

(87) PCT Pub. No.: WO2011/050495
PCT Pub. Date: May 5, 2011

(65) Prior Publication Data
US 2012/0215773 A1    Aug. 23, 2012

(51) Int. Cl.
*G06F 7/00* (2006.01)
*G06F 17/30* (2006.01)
(Continued)

(52) U.S. Cl.
CPC .......... *G06F 17/30864* (2013.01); *G06Q 30/02* (2013.01)
USPC ........................................................ 707/723

(58) Field of Classification Search
CPC .............. G06F 15/16; G06F 17/30864; G06F 17/30867; G06F 17/30241

USPC ......... 707/602, 722–723, 727–728, 710, 748, 707/1/1; 705/319, 7.29; 709/203, 207; 345/440

See application file for complete search history.

(56) References Cited

U.S. PATENT DOCUMENTS 6,301,516 B1   10/2001   Ostrowski et al.
7,603,350 B1   10/2009   Guha
(Continued)

FOREIGN PATENT DOCUMENTS

| CN | 101116100 A | 1/2008 |
|----|-------------|--------|
| CN | 101470924 | 7/2009 |
| WO | WO 2004/102413 A1 | 11/2004 |

OTHER PUBLICATIONS

Authorized officer Wei Wang, International Search Report and Written Opinion of the International Searching Authority in International Application No. PCT/CN2009/001206, mailed Jun. 17, 2010, 14 pages.

(Continued)

*Primary Examiner* — Usmaan Saeed
*Assistant Examiner* — Cecile Vo
(74) *Attorney, Agent, or Firm* — Fish & Richardson P.C.

(57) ABSTRACT

Methods, systems, and apparatus, including computer programs encoded on computer storage media, for analyzing quality of user-generated content involve identifying interactions between users through an electronic network and assigning a weighting factor to each interaction representing a quality of the interaction. A user credential score is generated for each user based on the weighting factors for each interaction. The user credential scores are stored in association with a user identifier on a computer-readable storage device.

20 Claims, 7 Drawing Sheets

(51) Int. Cl.
*G06Q 30/02* (2012.01)
*G06F 13/14* (2006.01)

(56) References Cited

U.S. PATENT DOCUMENTS

| | | | |
|---|---|---|---|
| 7,792,761 B2 * | 9/2010 | Murakami et al. | 705/319 |
| 7,814,048 B2 * | 10/2010 | Zhou et al. | 707/602 |
| 8,126,882 B2 * | 2/2012 | Lawyer | 707/723 |
| 8,150,842 B2 * | 4/2012 | Brougher et al. | 707/723 |
| 8,185,515 B2 * | 5/2012 | Lavine | 707/710 |
| 2005/0216434 A1 | 9/2005 | Haveliwala et al. | |
| 2010/0205035 A1 * | 8/2010 | Baszucki et al. | 705/10 |

OTHER PUBLICATIONS

Office Action, including rejected claims, issued in Chinese Application No. 200980162592.4 on Nov. 2, 2014, 27 pages (with English translation).

* cited by examiner

Scuba Questions 200 https://www.scubaquestion.com/forums/travel

Enter a search term:
214 [Search]

| | 206 last post | 208 | 210 | 212 |
|---|---|---|---|---|
| 202a Where to stay in Turks and Caicos [techdiver] 204a | [dive4fun] 204j | 10 | 1 | 6:16 p.m. |
| 202b Best Dive Operator in Cancun [headed4mex] 204b | [diverdan] 204k | 46 | 11 | 5:49 p.m. |
| 202c Is scuba insurance worth the expense? [cheapdives] 204c | [scubasam] 204l | 67 | 19 | 5:02 p.m. |
| 202d My trip to Phuket [traveler] 204d | [yellowbcd] 204m | 28 | 2 | 4:37 p.m. |
| 202e Baggage restrictions on airlines – heavy gear [maddog] 204e | [lobstahdive] 204n | 92 | 23 | 4:31 p.m. |
| 202f Where to find shallow wrecks [scubafun] 204f | [bob] 204o | 23 | 4 | 3:56 p.m. |
| 202g Recommendation for cave certification [beachdweller] 204g | [underh2o] 204p | 3 | 0 | 3:20 p.m. |
| 202h What to pack for Costa Rican liveaboard [maddog] 204e | [flipperz] 204q | 18 | 2 | 2:48 p.m. |
| 202i Best resort for diving on Roatan [helpmedive] 204h | [michelle] 204r | 34 | 7 | 2:35 p.m. |
| 202j Off the beaten path – best fresh water dives [Nik] 204i | [cheapdives] 204c | 59 | 6 | 1:23 p.m. |
| | | | | *More >>* |

FIG. 2

RANKING USER GENERATED WEB CONTENT

TECHNICAL FIELD

This specification generally describes techniques for analyzing web content, including user-generated web content.

BACKGROUND

A web site or electronic community (e.g., a collection of web sites hosted by the same entity) can host one or more types of electronic content that is created and/or uploaded by the users of the web site. For example, discussion forums, electronic photo albums, and video sharing web sites provide users with the ability to post or upload user-generated content to share with other users. Some host web sites require each user to log in using identification information before contributing content. In this manner, the content may be positively associated with a registered user. In some circumstances, users can interact with each other. Within a discussion forum, for example, a first user can post a question or comment and other users can respond to the posting made by the first user.

SUMMARY

This specification describes techniques for weighting interactions between users in an electronic community and generating user credential scores based on interactions between users. In general, user-generated content items, e.g., comments to a blog or answers posted on a question answering web site, can be analyzed to assign quality factors. The user-generated content items can additionally be analyzed to assess quality of input and identify individual interactions between users (e.g., one or more users uploading responses to a question posed by a first user). The interactions can be represented in a social, or user activity, graph having weightings assigned to directed links between pairs of users based on the assigned quality factors. These weightings and the corresponding interactions can be used to produce user credential scores.

In general, one aspect of the subject matter described in this specification can be embodied in methods that include the actions of u identifying by operation of a computer multiple interactions between users through an electronic network, where each interaction is between a pair of users, and assigning to each interaction a weighting factor that represents a quality of the interaction. One or more processors are used to generate a user credential score for each of multiple users. The user credential scores are based on the weighting factors for each of multiple interactions. The user credential scores are stored in association with a user identifier on a computer-readable storage device. Other embodiments of this aspect include corresponding systems, apparatus, and computer programs, configured to perform the actions of the methods, encoded on computer storage devices.

These and other embodiments can each optionally include one or more of the following features, alone or in combination. A search query is received, and a processor is used to identify user-generated content entries or items responsive to the search query and to rank the identified user-generated content items based, at least in part, on the user credential scores associated with the items. The identification of user-generated content items responsive to the search query can involve assigning a measure of content relevance for each item, and the ranking of the user-generated content items based on the user credential scores can involve combining the user credential scores associated with the items with the measures of content relevance for the items. The user credential scores and the measures of content relevance can be normalized, and the combination of the user credential scores associated with the items with the measures of content relevance for the items can involve combining the normalized user credential scores with the normalized measures of content relevance. A processor can be used to generate a user activity graph identifying links between users based on the interactions between users, to determine an authority score for each user, and to determine a contributiveness score for each user. The authority score for a particular user can be based on contributiveness scores of users with whom the particular user is linked in the user activity graph, and the contributiveness score can be based on authority scores of users with whom the particular user is linked in the user activity graph. The authority scores and the contributiveness scores are generated using an iterative updating process until the iterative updating process reaches a predetermined convergence threshold. The user interactions can correspond to user-generated content on at least one of a question answering web site, a bulletin board web site, a blog, or a social networking web site. The weighting factor can include a combination of multiple quality factors, and quality factors can include a relevance of a content item by one user to an associated prior content item by another user, an originality of a content item relative to other content items, a coverage of a content item corresponding to a measure of uncommon terms in the content item, a richness of the content item, or a timeliness of a content item. Users can be rewarded based on the user credential scores.

In general, another aspect of the subject matter described in this specification can be embodied in methods that include the actions of receiving and publishing user-generated content for access across a network, storing user-generated content, and identifying interactions between pairs of users relating to the stored user-generated content. A weighting factor is generated for each interaction based on an objective measure of quality of the interaction, a user credential score is generated for each user based on the identified interactions and the weighting factors for the interactions, and users or user-generated content based on the user credential scores.

These and other embodiments can each optionally include one or more of the following features. One or more servers can be used to receive and publish the user-generated content, user-generated content can be stored in one or more storage devices, and one or more processors can be used to identify the interactions, generate weighting factors, generate user credential scores, and rank users or user-generated content. A user credential score for each user is generated by iteratively updating an authority score and a related contributiveness score based on the identified interactions and the weighting factors. A search query can be received, and multiple user-generated content items are identified in response to the search query. The identified user-generated content items are ranked based, at least in part, on the user credential score for a user associated with each user-generated content item, and a set of search results is generated based on the ranking of content items. The identified user-generated content items can be ranked based on a weighted combination of a measure of relevance associated with each user-generated content item and the user credential score for a user associated with each user-generated content item. The objective measure of quality of the interaction is derived from a combination of factors representing a relevance of a content item by one user to an associated prior content item by another user, an originality of a content item relative to other content items, and a coverage of uncommon terms in the content item. A particular one of the interactions can include an electronic response by a first user to electronic information posted by a second user, and the weighting factor for the particular interaction can relate to a relevance of the electronic response by the first user to the electronic information posted by the second user, a coverage of relatively uncommon information in the electronic response, or a relative originality of the electronic response.

Particular embodiments of the subject matter described in this specification can be implemented so as to realize one or more of the following advantages. Quality of postings or other user-generated content can be assessed and used for purposes of generating search results, rewarding users for high quality input, or restricting access based on low quality contributions. Interactions or relationships between users can be evaluated to identify relatively authoritative or reliable contributors. Search engines can use user credential scores to generate search results. Search results can be personalized by, for instance, using a relationship strength between users A and B, along with the scores of user B, to adjust the relative position in which content created by, or related to (e.g., commented on by, replied to by, etc.), user B appears in the results of searches performed by A. Using such a personalization capability, the adjustment may be different for some different user C as a function of the relationship strength between users B and C.

The details of one or more embodiments are set forth in the accompanying drawings and the description below. Other features, objects, and advantages of the subject matter will be apparent from the description and drawings, and from the claims.

DESCRIPTION OF DRAWINGS

FIG. 2 is an example screenshot of a web page for a question answering electronic discussion board.

Like reference symbols in the various drawings indicate like elements.

DETAILED DESCRIPTION

Figure 1:
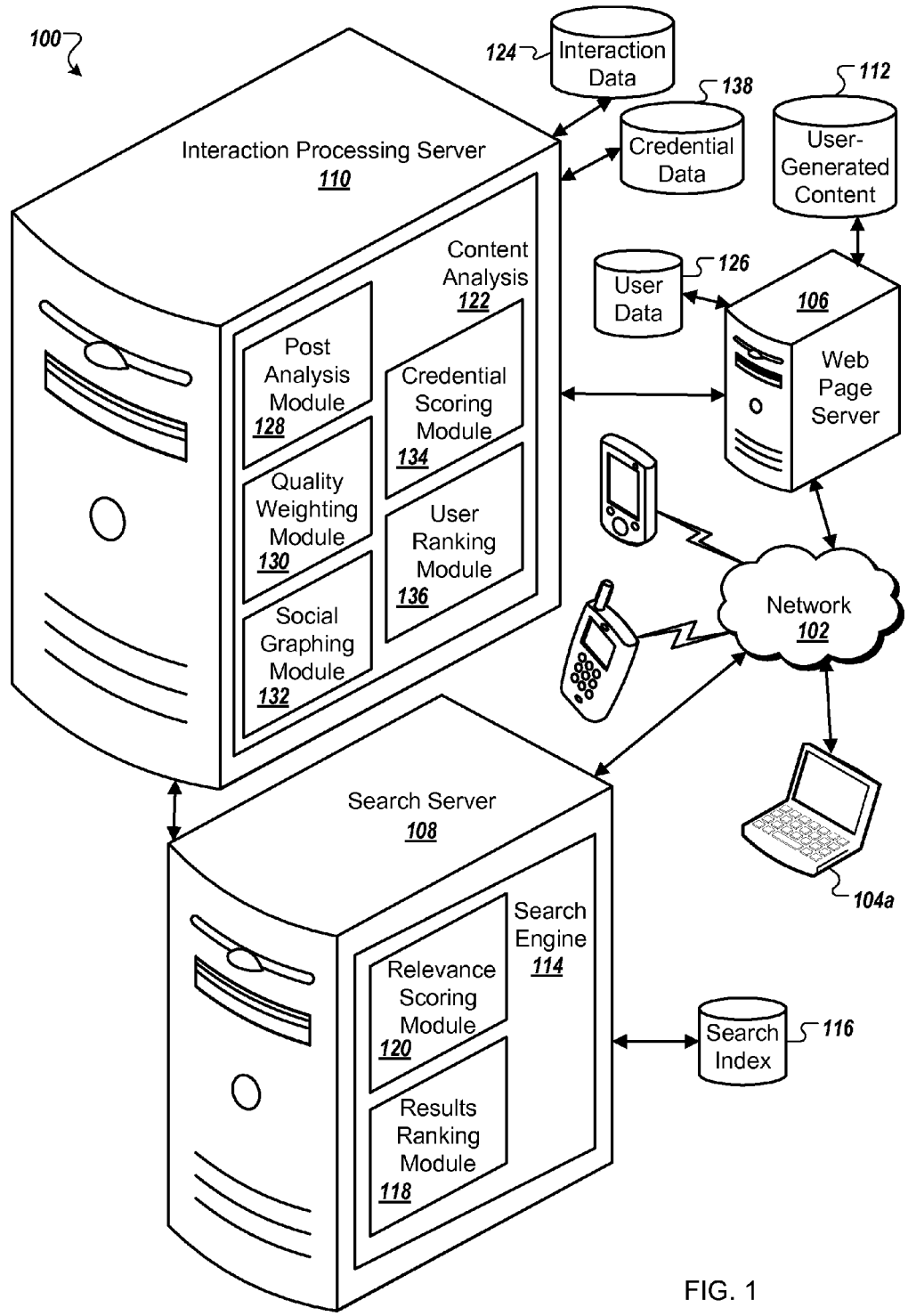
FIG. 1 is a block diagram of a system for ranking search results in searches of user-generated content.

Much of the media content available electronically today is user-generated, that is, produced by a person who is not employed by the site hosting the content. The term "media content" or simply "content" may refer to a single electronic document, a collection of related electronic documents which can include audio, visual, and/or textual components, or a portion of an electronic document. In some examples, text, photos, or videos may be added to a hosting web site by a registered user to share with other (registered or non-registered) users. The quality and subject matter relevance of the media content supplied by users can vary.

Frequently, sites which host user-generated content provide a framework for users to interact with each other regarding user-generated content to produce additional user-generated content. For example, a first user may post a question to a discussion forum and a second user may post a response to the question. This exchange of information between two users may be described as an interaction. Other exemplary user activities which may contribute to one or more interactions include submitting a question or answer on a question and answer (Q&A) website, posting a topic or discussion on a blog or online bulletin board, submitting a rating for content available on a website, or viewing new content provided by a first user operating a first user device (e.g., by a second user viewing the new content on a second computing device). A system and method for ranking user-generated content can provide a quality weighting of interactions between users in an electronic community and generate user credential scores based upon interactions between users. Each user and each user-generated content item may be associated with a relative quality value based upon the interactions between the users. For example, authority scores can be assigned to users based on an analysis of quality of responses to user-generated content and contributiveness scores of users who posted the content, and contributiveness scores can be assigned to users based on an analysis of quality of posted or uploaded user-generated content and authority scores of users who responded to the content. Moreover, user interactions may be viewed as a vote of confidence, such that numerous interactions, particularly interactions involving particularly authoritative and/or contributive users, tend to increase the user credential score(s). The interactions can be represented in a social, or user activity, graph having weightings assigned to directed links between pairs of users (e.g., a link between the user who posted a question and the user who answered the question). These weightings and the corresponding interactions can be used to produce user credential scores.

The described techniques can provide for one or more benefits, e.g., ranking user credibility to improve upon the overall community within the electronic environment. For example, a user who is abusing the privileges of the electronic environment (e.g., spamming or making harassing comments towards others) may be automatically discovered, while a user who frequently contributes to high quality interactions may be promoted or rewarded. The techniques may also be used to improve the ranking of search results that include user-generated content by providing a measurement of quality (e.g., topic relevance, contributiveness, descriptiveness, or reputation of the source of the content) associated with the user-generated content. Preexisting user relationships (e.g., based on the number and/or quality of prior interactions) can also be used to personalize search results for the particular user who conducts a search, e.g., by increasing the relevance score of search results associated with users with whom the particular user has previously interacted (e.g., based on a combination of the user credential scores of the other users and the relationship strength between the searching user and the other users). In some implementations, the user credential scores (and any rankings based on the scores) can be different for different categories or labels associated with the user-generated content. For example, user credential scores can be separately calculated for user-generated content relating to gardening versus user-generated content relating to dining. Thus, a particular user who participates in forums relating to gardening and dining can have different user credential scores associated with each category.

FIG. 1 is a block diagram of a system 100 for ranking search results in searches of user-generated content. Within the system 100, one or more users, operating user devices 104, can connect to a web server 106 and a search server 108 through a network 102 to search for, upload, and retrieve electronic content. The web server 106 and the search server 108 are each connected to an interaction processing server 110, directly or through network 102. The interaction processing server 110 can cooperate with the web server 106 to analyze user-generated electronic content and to derive quality measurements associated with the user-generated electronic content. The search server 108 can additionally collaborate with the interaction processing server 110 to augment search result ranking of user-generated content based upon the derived quality measurements.

The computer network 102, e.g., a local area network (LAN), wide area network (WAN), the Internet, or a combination thereof, connects the web server 106, the search server 108, and user devices 104a, 104b, and 104c. Example user devices 104 include personal computers, mobile communication devices, smart phones, personal data assistants (PDAs), and television set-top boxes. Although only one search server 108 and one web server 106 are shown, the system 100 may include any number of web servers, search servers, and user devices.

The web server 106 can be a general content server that receives requests for content and retrieves the requested content in response to the request. In some examples, the web server 106 may be related to a news content provider, a retailer, an independent blog, a social networking site, or any other entity that provides and/or receives content over the network 102. The web server 106 includes a user-generated content repository 112 and a user data repository 126 (e.g., each repository includes one or more electronic storage devices included within or coupled to the web server 106). The user-generated content, in some implementations, can include the content items themselves (e.g., one or more files uploaded by a particular user) as well as metadata associated with individual user-generated content (e.g., a user identification, a reference to associated user-generated content, a category of the user-generated content, a date the user-generated content was uploaded to the web server, a tally representing the number of times the user content item has been requested/viewed, and the like).

When a user provides user-generated content 112 to the web server 106, a user identifier (user ID) can be created or a user may register with the web server 106 using a user ID and password. Each user may provide additional profile information (e.g., sex, age, location, email address, etc.). Data associated with each user can be stored within the user data repository 126. As an example, each user record can include references to user content items uploaded by the user to the web server 106 and stored within the user-generated content repository 112. The user-generated content stored within the user-generated content repository 112 may be provided by the web server 106 in response to requests from the user devices 104 through the network 102.

The content available from the web server 106 can be searched using the search server 108. The search server 108 includes a search engine 114 and a search index repository 116. To facilitate generation of search results responsive to a user query, the search engine 114 can generated or access an index of the content provided by publishers such as the web server 106 (e.g., an index of web pages) for later search and identification of content items that are responsive to the queries. A user operating a user device, e.g., user device 104a, can submit a search query to the search server 108. The search engine 114 can search for web content responsive to the search query within the search index repository 116. The search server 108 can then return search results to the user in response to the search query. The search results, for example, can include web content references (e.g., lists of web page titles, snippets of text extracted from those web pages, or hypertext links to those web pages) that link to web pages available via the web server 106.

Search results may be presented to users grouped in predetermined numbers (e.g., ten) of search results. The search results are ranked by a results ranking module 118 based in part on scores related to the content items identified by the search results, e.g., information retrieval ("IR") scores and optionally a separate ranking of each document based upon document relevance scores provided by a relevance scoring module 120.

The search server 108 can communicate with the interaction processing server 110 to obtain data applicable to the relevance scoring of user-generated content items. The interaction processing server 110 includes a content analysis module 122. The content analyzer 122 can analyze the content and interactions represented within user-generated content (e.g., the user-generated content stored within the user-generated content repository 112) and generate scores related to the relevance and quality of individual content items (interaction data) and the authority or contributiveness of each user providing user-generated content (user data). The interaction processing server 110 can store data associated with each user (e.g., within a credential data repository 138) and data associated with the content and interactions represented by the user-generated content (e.g., within an interaction data repository 124).

In operation, the interaction processing server 110 retrieves user-generated content collected by the web server 106. Although the web server 106 is shown as having a connection to the interaction processing server 110, in some implementations the interaction processing server 110 may have direct access to the user-generated content repository 112. In other implementations, the interaction processing server 110 stores the user-generated content in a temporary storage location or in the interaction data repository 124. The interaction processing server 110 additionally receives or has access to a portion of the user data records (e.g., user identifications and related uploaded content) which can be included within the credential data repository 138.

A post analyzer 128 can analyze each user-generated content item, or post, to produce a quality value. In some examples, within the venue of an online discussion forum, a question is analyzed to determine its relevance to the forum topic, appropriateness of language (e.g., lack of profanity), and/or originality in relation to previously-posted questions. A response to a question within a discussion forum, in some examples, is analyzed to determine its relevance to the question, specificity of response, originality in relation to previously-posted responses, or promptness in relation to the timestamp of the original posting of the question. The post analyzer 128 can assign a quality score to each content item.

A social graphing module 132 within the content analyzer generates a social, or user activity, graph representing the interactions between different users based upon an association between two users regarding a user-generated content item, e.g., a comment posted by one user to a blog posting by another user. The user activity graph can be constructed of nodes, representing individual users, and directed and/or undirected links, representing an interaction between the two users. For example, a first user may upload a question regarding the best pizza available in Atlanta Ga., and then a second user may upload a response regarding a pizza restaurant in Atlanta. Each user would be represented by a node in the user activity graph, and the interaction would be represented by a directed link between these two nodes representing the second user's posting of a response to the first user's question. In some implementations, the user activity graph also identifies relationships between users that are based on other types of connections between users. For example, user A may be a friend of user B, or user C may be interested in any content posted by user D. These types of relationships can be either explicit (user A declared that user B is his/her friend) or implicit (based on a history of many earlier interactions, content analysis, or the like, it is possible to infer that user A is a friend of user B). Interactions reflected in social or user activity graphs may also be based on such relationships.

A quality weighting module 130 can assign weights to each link within the user activity graph generated by the social graphing module 132. The weights, for example, may represent the quality of one or both of the user-content items involved within the interaction (e.g., the quality of the question in relation to the forum or the quality of the answer in relation to the question).

A credential scoring module 134 can analyze the user activity graph produced by the social graphing module 132 to assign credential scores to the users associated with the user-generated content items. The user credential scores can be used to represent the reputation or credibility of a particular user. The user credential scores can be based, in part, on the quality of the content item(s) provided by the user (e.g., as determined by the post analyzer 128) as well as the quality of the interactions that the user has become involved in. For example, when a user responds to a high quality question with a high quality answer, the interaction may positively impact the user's credential score. Alternatively, if a user responds to a question with a low quality answer, the interaction may negatively impact the user's credential score. If the user responds to a question posted by a user with a high credential score, the interaction may generate a more positive impact to the user's credential score than if the user responds to a question posted by a user with a low credential score. In another example, if a question posted by a user receives high quality responses by users with high credential scores, the interaction may generate a positive impact to the credential score of the user who posted the question. In some implementations, the user credential scores are calculated in part by using a Hypertext Induced Top Selection (HITS) algorithm that accounts for the weighted links.

Based upon the user credential scores, a user ranking module 136 can rank the users who have contributed user-generated content to the web server 106. The user rankings, in some implementations, can be used to promote or reward users for contributing a large number of high quality content items. For example, the highest-ranking user(s) may be rewarded with gift certificates, prizes, or other incentive items. In another example, the top one or more users can be reported to the web server 106 where an indication of user status (e.g., "top 10", "top 100", "star contributor", etc.) can be embedded within web pages which include user-generated content created by those users. In other implementations, the user rankings can be used to help in identifying poor quality users. For example, the lowest ranking user(s) may be further evaluated as potential spammers.

As users submit user-generated content to the web server 106 (e.g., on a per-item or batch basis), the user-generated content can be provided to the interaction processing server 110 where the content can be analyzed and scored based upon the quality of the contributions by the post analyzer 128. The user credential scores can be continually or periodically updated by the credential scoring module 124 based upon the addition of interactions to the user activity graph generated by the social graphing module 132 and the associated interaction weights calculated by the quality weighting module 130. The interaction data generated by the post analyzer 128, the quality weighting module 130, and the social graphing module 132 can be stored within the interaction data repository 124. The user credential scores generated by the credential scoring module 124 can be stored within the credential data repository 138.

When the search server 108 receives a search query with responsive web page results that include user-generated content, the results ranking module 118 can provide the interaction processing server 110 with the identification of each user-generated content item included within the query result list. The interaction processing server 110 can retrieve user credential scores associated with the identified user-generated content and provide the user credential scores to the search server 108. The results ranking module 118 can normalize the user credential scores and optionally normalize the relevance scores calculated by the relevance scoring module 120. The results ranking module 118 can then combine the user credential scores and the relevance scores to generate a ranked search results list. In some implementations, the information retrieval (IR) scores can be computed from dot products of feature vectors corresponding to a query and a content item, and the ranking of the search results can be based on relevance scores that are a combination of the IR scores and the user credential scores. The search server 108 can then respond to the user who initiated the query with the ranked search results list. The user can select a result from within the result list to retrieve the user-generated content or other content from the web server 106.

Although the web server 106, the interaction processing server 110, and the search server 108 are each represented as individual machines, in some implementations, one or more of the servers 106, 108, or 110 are combined within a single server. Similarly, the user data repository 126 and the credential data repository 138, in some implementations, are combined within the same records which may reside within the same storage device(s). The functionalities of the post analyzer 128, the quality weighting module 130, the social graphing module 132, the credential scoring module 134, or the user ranking module 136, in some implementations, are combined within a single software application. Other implementations are possible.

FIG. 2 is an example screenshot of a web page 200 for a question answering electronic discussion board related to scuba travel. A user may access or register with the electronic discussion board to post a question related to scuba travel or to respond to a question posted by another user. The web page 200 includes a series of questions 202, each attributed to a particular user identifier 204. A last posted column 206 lists which user 204 most recently responded to the associated question 202. A total view column 208 lists the number of users who have viewed the Q&A exchange associated with each question 202. A total responses column 210 lists the number of responses provided to each question 202. A time column 212 provides the timestamp of the most recent response to each question 202. A search box 214 offers a user interacting with the web page 200 the opportunity to search the electronic discussion board. In some implementations, the web page 200 depicts a particular forum of a larger electronic community. For example, the electronic discussion site may pertain to many scuba topics (e.g., underwater photography, gear recommendations, safety tips, etc.) with a separate forum devoted to each topic.

By selecting a question 202, for example, a user may be presented with another web page including the full text of the question (if it was truncated within the web page 200 due to length) along with a series of answers related to that question. A user may also, in some implementations, select a user identifier (e.g., the user identifier techdiver 204a) to receive additional information regarding that user. In some examples, selection of the user identifier techdiver 204a may launch an additional web page displaying profile information regarding the user techdiver 204a (e.g., location, sex, age, scuba interests, date registered with the electronic discussion board, timestamp of most recent visit to the electronic discussion board, credential scoring/ranking of the user, etc.) and/or a listing of each post (questions and answers) contributed by the user techdiver 204a. In some implementations, viewing of information by one user 204 about another user 204 can constitute an interaction that influences user credential scores.

Each question and answer pair can be termed an interaction between the users who authored the user-generated content. For example, the question 202b contributed by userheaded4mex 204b has been viewed 46 times, according to the total view column 208, with a total of eleven responses, according to the total responses column 210. Each of the eleven responses (and, in some cases, each of the 46 views) creates an interaction between the author of the response and the user headed4mex 204b. Users may be involved in more than one interaction. For example, the user maddog 204e submitted the fifth question 202e as well as the eighth question 202h. The user cheapdives 204c, in another example, contributed both the third question 204c and contributed the most recent response to the tenth question 202j.

Figure 3A:
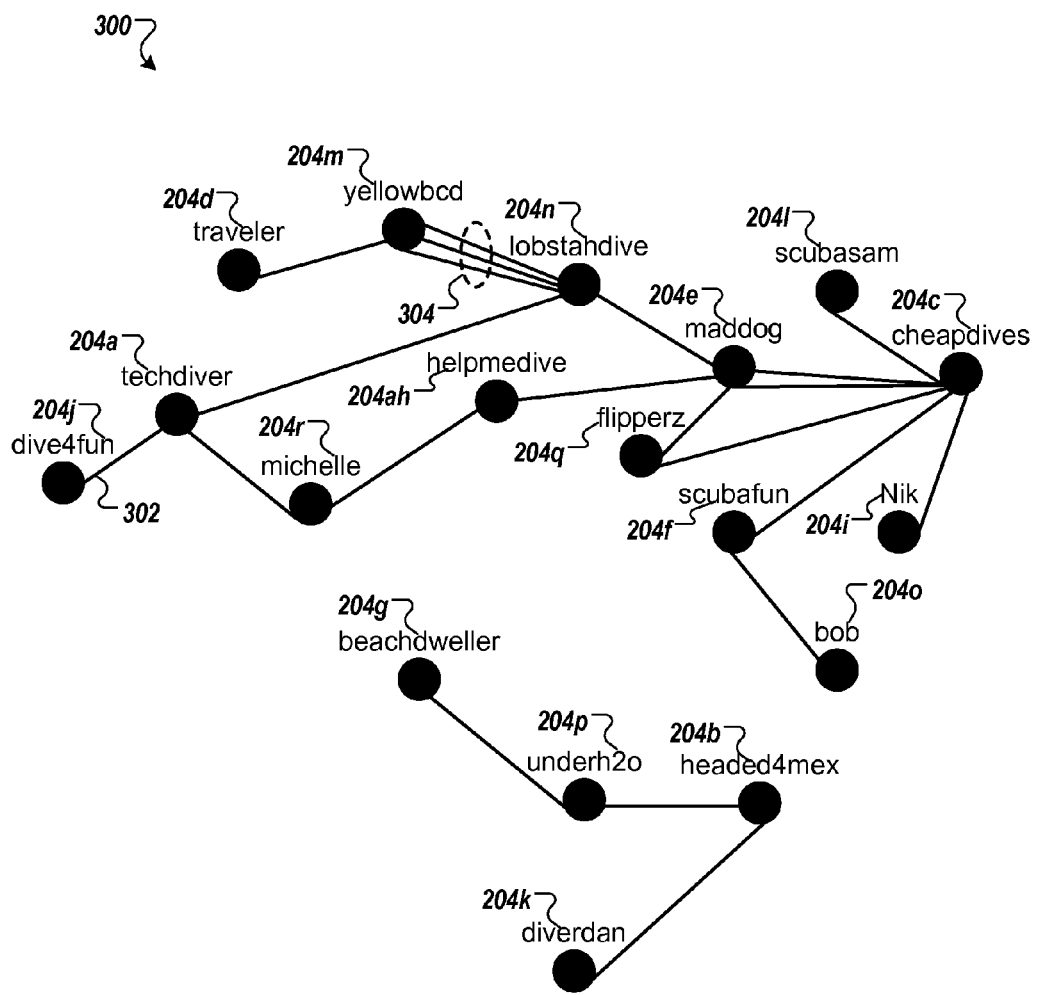
FIGS. 3A and 3B are diagrams of an example user activity graph.
Figure 3B:
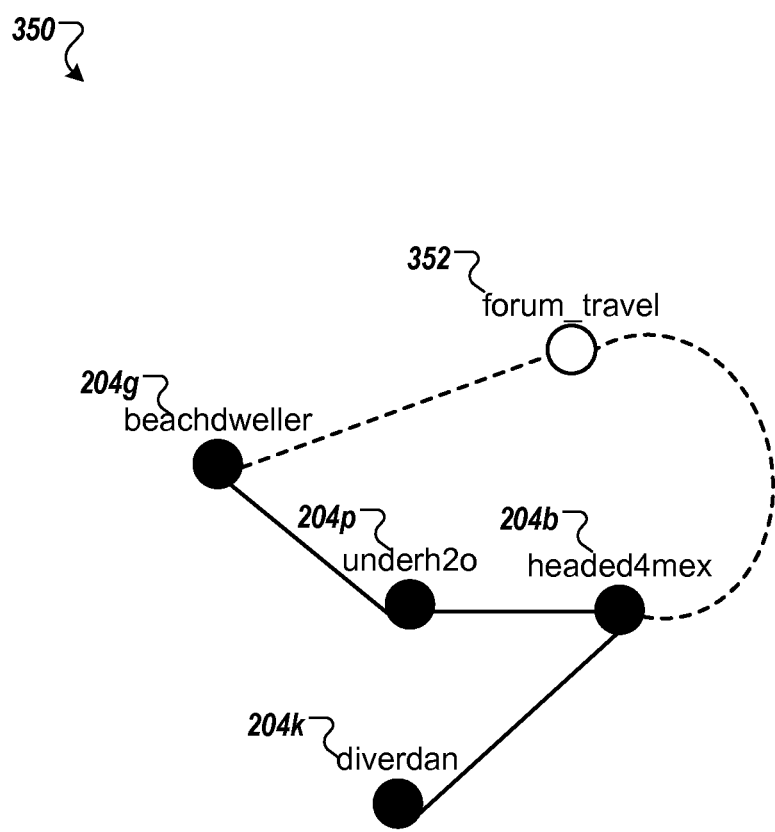

FIGS. 3A and 3B are diagrams of an example user activity graph 300 depicting exemplary interactions involving the users 204 registered to the electronic discussion board as described in relation to FIG. 2. The user activity graph 300, for example, can be generated by the social graphing module 132 as described in reference to FIG. 1. A user activity graph (also referred to as a social graph) represents entities and interactions (connections) between entities. In this example, users are represented as nodes in the graph and interactions are represented as lines connecting the nodes. Each of the nodes and connections can be stored as objects or otherwise defined in a data structure stored on a computer-readable storage device. Interactions, for example, can involve communications between two individual users, e.g., a response by the user lobstahdive 204n to a question posed by the user yellowbcd 204m. A pair of users may become involved in multiple interactions.

As shown in FIG. 3A, the users 204 are connected by lines representing question and answer interactions modeling interactions between users involving the questions 202 and the responses to the questions provided by the users listed within the last posted column 206 (as shown in FIG. 2). For example, the question 202a posed by the user techdiver 204a was answered by the user dive4fun 204j. The edge 302 within the user activity graph 300 represents this interaction. The user lobstahdive 204n and the user yellowbcd 204m, in another example, are connected by three edges 304 representing three individual interactions (e.g., a question by the user lobstahdive 204n responded to by the user yellowbcd 204m or vice versa). In some implementations, the edges are directed. For example, the edge 302 can be directed towards the user techdiver 204a from the user dive4fun 204j, the interaction being related to the response which was directed towards the question 202a.

Not all of the users are necessarily interconnected together by interactions within a user activity graph. For example, the users beachdweller 204g, underh2o 204p, headed4mex 204b and diverdan 204k are separated from the rest of the group of users 204. Any number of interactions can be represented between users within a user activity graph. In some implementations, the edges within a user activity graph can be weighted. For example, a quality score can be associated with each interaction between a pair of users 204. In some implementations, the quality weighting module 130 as described in relation to FIG. 1 can apply weights (e.g., 0.3 or 0.5) to the edges of the user activity graph 300 based, in part, on quality scores associated with the user-generated content contributed by one or both of the users involved within the interaction.

When a user posts a new question to the electronic discussion board, there is no other user involved within the interaction. In some implementations, as shown in FIG. 3B, a default user forum_travel 352 is introduced to create an interaction between the user posting the new question and the discussion forum. A quality weighting associated with the interaction between the default user forum_travel 352 and the user beachdweller 204g, for example, can be based in part upon the relevance of the question posed by the user beachdweller 204g in relation to the topic of the electronic discussion board (e.g., scuba travel). For example, a question posted by the user beachdweller 204g regarding inexpensive mail order prescription medicine may be awarded a low quality rating, while a question posted by the user headed4mex regarding diving the cenotes near Playa del Carmen may be awarded a high quality rating.

Figure 4:
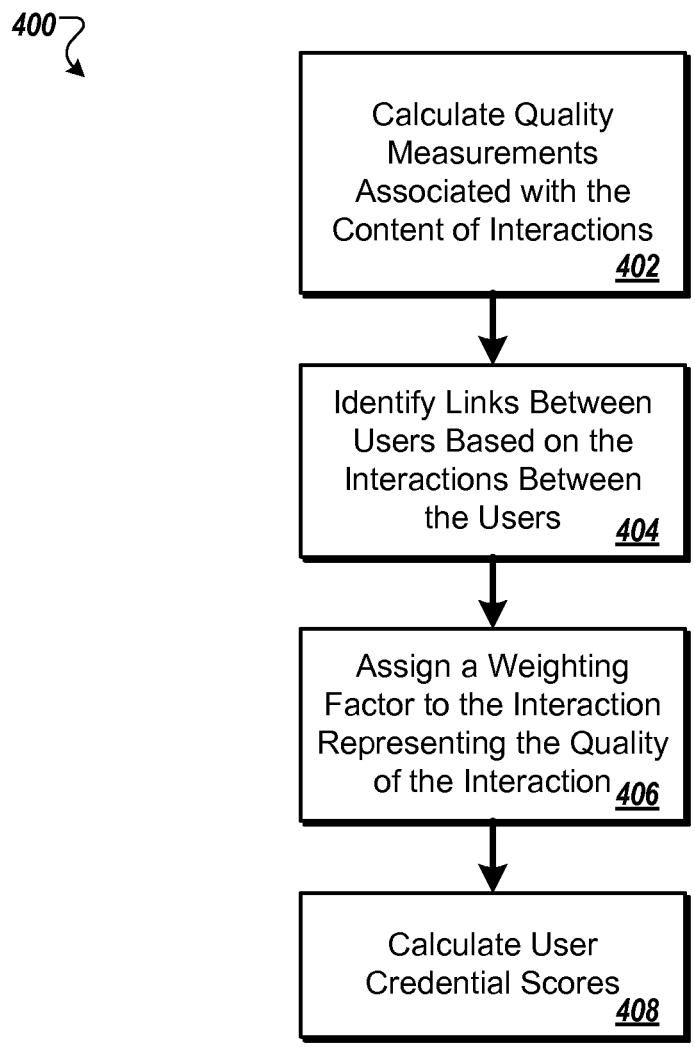
FIG. 4 is a flow diagram of a process for generating user credential scores.

FIG. 4 is a flow diagram of a process 400 for generating user credential scores based, in part, upon interactions involving each user. The process 400, in some implementations, is executed by the content analyzer 122 as described in FIG. 1.

Quality measurements associated with the content of user interactions are calculated at 402. The user interactions, in some examples, includes the upload of new user-generated content through the submission of a question or answer on a question and answer (Q&A) website or the posting of a topic or discussion on a blog or online bulletin board. Each user-generated content item can be evaluated to determine a quality score. The quality score may be based upon a number of factors, e.g., the relevance of the content item, the originality of the content item, or the level of focus of the content item. In some implementations, the quality score of a user-generated content item includes a collection of individual factor scores.

The quality of a user-generated content item can be evaluated based, in part, upon the context in which the content item was introduced. In some examples, a relevance factor is used to evaluate the relevance of a user-generated content item with relation to the topic of the website, bulletin board, or topic forum, or to the question to which the content item responds. In some implementations, a relevance factor is calculated using Latent Dirichlet Allocation (LDA).

Another exemplary evaluation factor is coverage, referring to the generality or specificity of a posted content item in terms of the vocabulary employed within the content item. Coverage can be used as an indication of the level of focus of the user contribution. The coverage factor, in some implementations, is measured using the inverse document frequency (IDF) of words within the user-generated content item.

A user content item can additionally be evaluated based upon its originality. For example, a question posted to a Q&A website may be compared to other questions posted to the website or an answer posted to a Q&A website may be compared to other answers to the same or a similar question. In some implementations, the originality of a content item can be based, in part, on a comparison with other content items contributed by the same user. For example, a user posting a same message (e.g., spam) across multiple topics of a Q&A website may be discovered by examining the originality across all of the content provided by that user. The originality score, in some implementations, is measured through, e.g., the BLEU (Bilingual Evaluation Understudy) scoring method. In some implementations, the post analyzer 128 as described in FIG. 1 applies quality scores to user-generated content items.

Links are identified between users based on the interactions between the users at 404. Interactions between two users such as a "replied-to" activity can be used to establish links between the individual users. A common type of interaction may involve a first user uploading new user-generated content and a second user responding to that user-generated content in some manner (e.g., viewing, ranking, rating, or uploading a new user-generated content response). In another example, when a user uploads a new question to a Q&A website or posts a discussion on an online bulletin board, the interaction is considered to be between the user and the website or bulletin board. In some examples, links connect two users based upon an answer posted by a second user in response to a question posted by a first user, a rating posted by a second user in reference to content provided by a first user, or a comment posted by a second user in response to a blog entry posted by a first user. In some implementations, a virtual user (e.g., node) represents one end of an interaction. For example, if a first user posts a new question to a bulletin board, the bulletin board may be represented by a virtual user. In this manner, for example, if a user posts an irrelevant topic to a discussion board, and no users respond to the irrelevant post, the process 400 has a method for applying a quality score to the user-generated content and adjusting the credential score(s) of the user accordingly.

A weighting factor representing the quality of the interaction is assigned to the interaction at 406. Quality scores related to the aforementioned factors of relevance, coverage, and originality, and/or other factors (e.g., timeliness of contribution, multimedia inclusion, rich media inclusion, etc.) can be individually weighted and combined to generate a single overall quality score for the content item. The quality score, in some examples, is a numeric rating (e.g., a value between 1 and 10 or 1 and 100, etc.) or a category rating (e.g., positive, neutral, or negative). In some implementations, the quality scores related to the individual quality factors can be weighted based upon learned coefficients and combined to produce a quality weighting. For example, learned coefficients can be generated and applied to the individual quality factors based upon the relative importance of each quality factor in relation to the electronic community. The coefficients may differ depending upon the type of electronic community. For example, in some implementations the timeliness of a response to a user post is of greater importance than the coverage of a user post. In some implementations, the quality weighting module 130, as described in FIG. 1, calculates the weighting factors associated with the interaction links.

User credential scores are calculated at 408. The user credential scores, for example, make an effort to quantify the value of contributions made by a particular user to an electronic community. In general terms, a user may either contribute new content or provide feedback regarding content contributed by another user. Each role taken by a user can be considered separately when generating credential scores for the user. In the first place, a contributiveness score can be assigned to a user based upon the quality of contributions the user has made to the electronic community (e.g., website, discussion board, forum, etc.). For example, the contributiveness score represents a measurement of how many questions a particular user has asked and how much interest the questions generated among other authoritative users within the electronic community. Secondly, an authority score can be assigned to a user based upon the quality of responses or ratings the user has made to user-generated content contributed by other users to the electronic community. The authority score, for example, may represent a measurement of the number of useful responses a user has provided to the electronic community. A user may have a high contributiveness score and a low authority score or vice-versa, depending upon the manner in which the user interacts with the electronic community. In some implementations, the scores can be calculated in accordance with a time decay, such that older interactions have less of an impact on the weightings and/or the scores than more recent interactions.

In some implementations, a modified version (as described in connection with FIG. 5 below) of the Hyperlink-Induced Topic Search (HITS) algorithm is employed to generate the contributiveness and authority scores of each user. For example, the contributiveness score for a particular user may be generated by scaling and weighting (e.g., by the quality score(s) of the user-generated content item(s) involved in the interaction) the authority scores of the other users involved in interactions with that user. Similarly, the authority score for a particular user may be generated by scaling and weighting (e.g., by the quality score(s) of the user-generated content item(s) involved in the interaction) the contributiveness scores of the other users involved in interactions with that user. In this way, a positive (high quality) response posted by an authoritative second user to a content item generated by a first user may increase the contributiveness score of the first user. Alternately, a negative (low quality) response posted by a distrusted (spammer) second user may be discounted when calculating the contributiveness score of the first user. Once the contributiveness and authority scores have been assigned, a total user reputation score may be calculated based upon a combination (e.g., an average or some other linear or nonlinear combination) of the two user credential scores.

Figure 5:
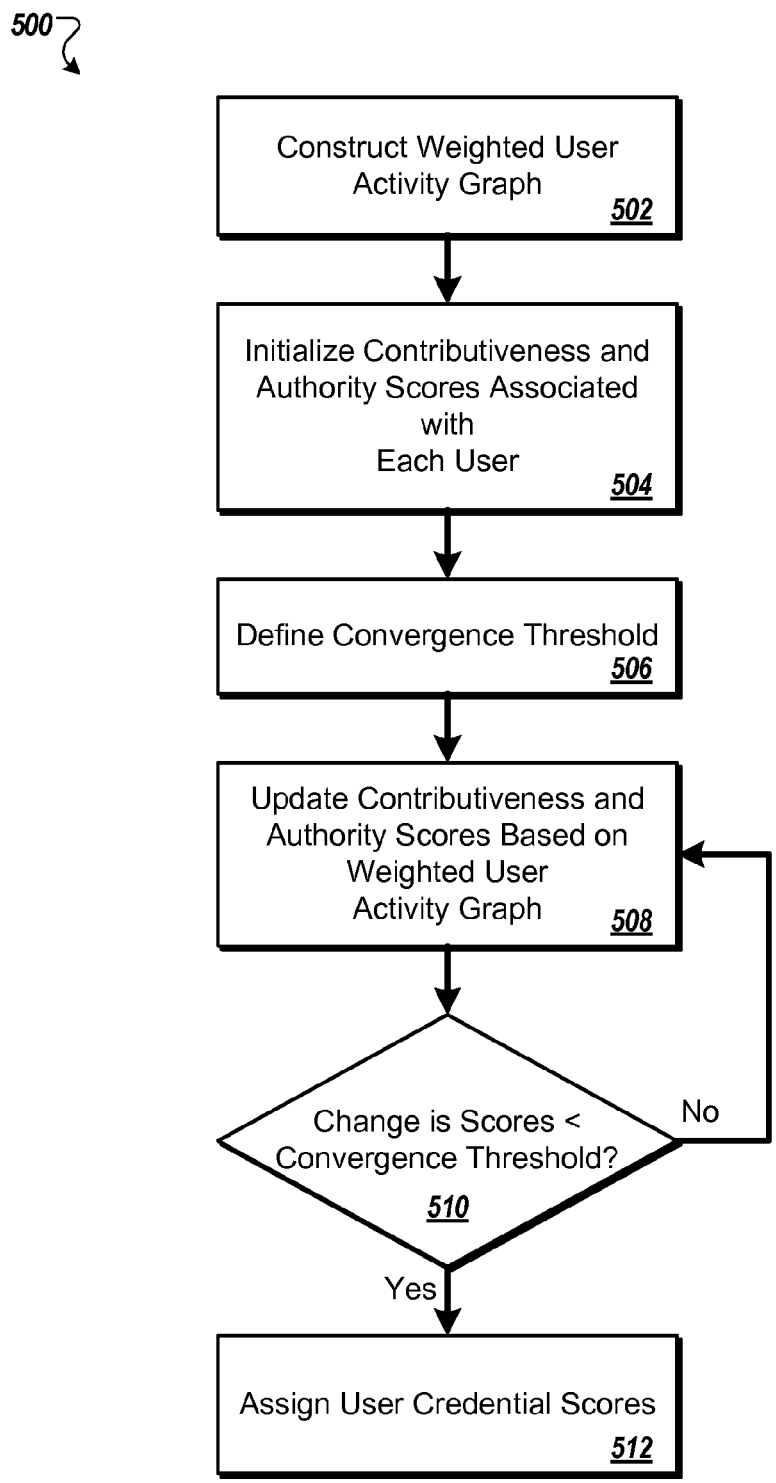
FIG. 5 is a flow diagram of another process for generating user credential scores.

FIG. 5 is a flow diagram of a process 500 for generating user credential scores (e.g., contributiveness and authority scores). The process 500, for example, is executed using a modified version of the HITS link-based ranking algorithm where the authority score for the user is used in place of the conventional HITS estimate of the value of the content as an authoritative source and the user contributiveness score is used in place of the conventional HITS hub score which estimates the value of the user as an authoritative reference. Moreover, the modified HITS algorithm can also use the weighted links in generating the user credential scores. In some implementations, the content analyzer 122 (as described in relation to FIG. 1) can execute the process 500.

A weighted user activity graph is constructed at 502. Based upon the interaction links derived within the process 400 (as described in relation to FIG. 4), with each directed link between two users being weighted by a quality factor associated with the user-generated content item(s) involved in the interaction, an affinity matrix can be constructed defining the weighted interactions between users. For example, the matrix element $A(u_i, u_j)$ can be populated with a combination (e.g., sum, weighted sum, etc.) of the interaction quality weighting factors between the first user $u_i$ and the second user $u_j$. In some implementations, the user activity graph is generated by the social graphing module 132 (as shown in FIG. 1).

Contributiveness and authority scores associated with each user are initialized at 504. A base value for contributiveness and authority scores initializes the system such that relative contributiveness and authority scores may be obtained based upon the neutral starting point. A random initial value can be assigned. In some implementations, the contributiveness score and the authority score are each represented by a vector equation. The contributiveness score, for example, may be considered a representation of the user activity graph with the links directed in a first orientation (e.g., from the responder to the questioner) while the authority score may be considered a representation of the user activity graph with the links directed in the reverse orientation (e.g., from the questioner to the responder). The random initial values, for example, can be obtained through a random sampling of content item quality scores. In some implementations, the initial values equal, approximate, or otherwise are based on values generated in a prior execution of the HITS-based algorithm (e.g., to update the user credential values after additional interactions occur).

A convergence threshold is defined at 506. The convergence threshold can be used to define a stopping point at which the authority scores and contributiveness scores of each user have been calculated.

Using the convergence threshold as a guideline, the contributiveness and authority scores are updated based on the weighted user activity graph at 508. The vector scores can be calculated, for example, using an algorithm involving normalizing first each row of the user activity graph matrix and then each column of the user activity graph matrix.

If the change in scores (between the randomly initialized values and the calculated values) is found to be greater than or equal to the convergence threshold at 510, the algorithm is repeated. At the conclusion of each iteration, the change in scores between the previously calculated values and the currently calculated values is compared to the convergence threshold. In some implementations, the initialization and calculation of the user scores are performed by the credential scoring module 134. In the example of a system in which there are a large number of user-generated content items, the user credential scores are iteratively calculated across multiple computer processors in parallel.

Once the change in scores is less than the convergence threshold, the user credential scores are assigned at 512. For example, the contributiveness score and the authority score associated with each user can be stored within the credential data repository 138 (as shown in FIG. 1) in association with the corresponding user identifier. The contributiveness score and the authority score can optionally be combined to generate an overall user reputation score. Based upon the user credential scores (contributiveness, authority, and/or reputation), the users can optionally be ranked (e.g., by the user ranking module 136 of FIG. 1).

The process 500 may be repeated as often as desired to update user credential scores based upon new user-generated content items added to the electronic community. For example, the process 500 may be repeated daily or weekly to generate updated user credential scores and, optionally, to update the ranking of individual users within the electronic community. In some implementations, the process 500 can be performed incrementally, e.g., by incrementally adjusting user credential scores after each new interaction. The quality of a new interaction, for example, can be used to adjust user credential scores (authoritativeness and contributiveness) for users in the vicinity of the interaction in the user activity graph. In some implementations, a propagation distance parameter can be defined to limit the propagation of score adjustments in the overall user activity graph. For example, a propagation distance parameter value of two can limit the incremental recalculation of user credential scores to nodes that are within two links of the link that corresponds to the new interaction. Thus, in this example, nodes representing users will not be impacted if those users have no interaction history with the users involved in the new interaction or with users within two links of the users involved in the new interaction. Accordingly, for each new interaction, the social activity graph can be updated with the new link and the user credential scores for users within the propagation distance on the social activity graph can also be updated. In some implementation, instead of, or in addition to, limiting the propagation distance, the number of impacted nodes can be limited. For example, nodes to be updated can be selected according to nearness to the new link and number of interactions that directly or indirectly link the node to nodes connected by the new link. The incremental calculation of user credential scores can be used to provide substantially real time user rankings or access to user credential scores. Even with incremental score updating, calculation of scores for the overall user activity graph can be periodically calculated for all nodes using the iterative approach described above to ensure that the incremental updates do not cause divergence from the globally accurate scores.

Figure 6:
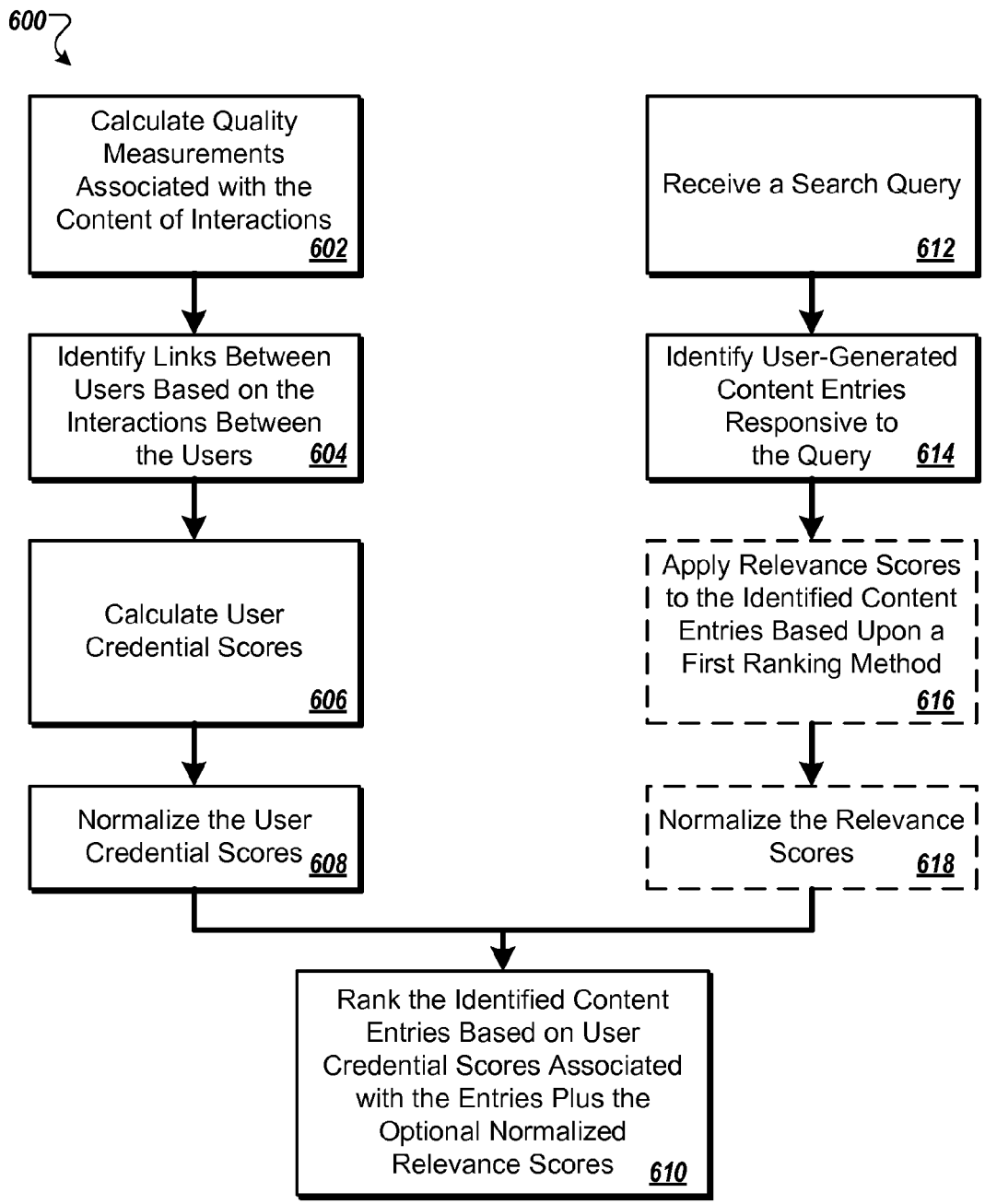
FIG. 6 is a flow diagram of generating a ranking of search results using user credential scores.

FIG. 6 is a flow diagram of a process 600 for generating a ranking of search results using user credential scores. The process 600, for example, may combine the activities of the search server 108 (as shown in FIG. 1) with the activities of the interaction processing server 110 to augment traditional search results ranking with user-generated content quality measurements. Quality measurements associated with the user-generated content items involved in interactions are calculated at 602. These quality measurements, in some examples, are based upon a number of factors including, but not limited to, relevance, coverage, originality, timeliness of contribution (e.g., with a quick response valued more highly than a slow response or vice versa), multimedia content, or rich media content.

Links are identified between users based on the interactions between the users at 604. The directed links can correspond to the reaction of one user (e.g., posted response, ranking, viewing, etc.) to a user-generated content item (e.g., question, blog, multimedia content item, etc.) provided by another user. The interactions occur, in some implementations, within an electronic community e.g., a Q&A website, discussion forum, or online bulletin board.

User credential scores are calculated at 606. User credential scores may include more than one individual score, e.g., a contributiveness score and an authority score. User credential scores may include a composite score such as a reputation score. The user credential scores may be calculated, for example, using the process 500 as described in connection with FIG. 5. In some implementations, the user credential scores are calculated by the credential scoring module 134 as shown in FIG. 1.

The user credential scores are normalized at 608. In order to base search results ranking in part upon the credential score of the user supplying the content item, the user credential scores are first normalized to provide a comparison base between search result scoring and user credential scoring. In some implementations, the user credential scores can be transformed to a standard Gaussian distribution. In some implementations, the user credential scores are normalized by the results ranking module 118 as shown in FIG. 1.

At the same or a different time as the steps 602 through 608 are being executed, a search query is received at 612. The search query may be responsive to one or more user-generated content items. The search query, in some examples, are submitted to the electronic community which contains the user-generated content items or to a general search engine. In some implementations, the search query is received by the search engine 114 as shown in FIG. 1.

User-generated content entries responsive to the query are identified at 614. The responsive content entries, for example, may be located based upon keyword matching between the search query and the text of the content items.

Relevance scores are optionally applied to the identified content entries based upon a first ranking method at 616. The search engine 114, for example, can apply information retrieval (IR) scores to the user-generated content entries to determine a first ranking of the items responsive to the search query. The Okapi BM25 ranking function, in one example, can be used to determine a relevance score of each user-generated content item in relation to the search query.

If relevance scores have been applied to the identified content entries, the relevance scores are normalized at 618. The normalization technique, for example, can be selected so that the normalized user credential scores from step 608 may be combined with the normalized relevance scores. In some implementations, the relevance scores can be transformed to a standard Gaussian distribution. In some implementations, the user credential scores are normalized by the results ranking module 118 as shown in FIG. 1.

Using the normalized user credential scores from step 608 and, optionally, the normalized relevance scores from step 618, the identified content entries are ranked based on user credential scores associated with the entries plus the optional normalized relevance scores at 610. In some implementations, the type of user credential score employed is based upon the type of user-generated content item referenced by the query search result. For example, if the content item is a response to a question, the user authority score can be normalized and combined with the relevance score for ranking. On the other hand, if the content item is a question, the user contributiveness score can be normalized and combined with the relevance score for ranking. When combining the normalized user credential score with the normalized relevance score, a weighting to one of the scores can be applied. For example, a weighting factor between zero and one can be applied to the normalized user credential score to represent the relative importance of the user reputation in ranking the user-generated content item within the query search results. The query search results may now be sorted by rank and returned to the requestor.

EXAMPLE

Integration of Quality Factor Scores

Given a collection of scores related to individual quality factors, e.g., coverage, originality, relevance, or timeliness, the following exemplary equations may be applied to generate a single quality indicator. This quality indicator may be used as a weighting within a user activity graph illustrating the interactions between users.

A linear combination, using the coefficient vector $\vec{\alpha}$, can be applied to generate a combined score $com(q_i, r_{ij})$ involving the response r in view of the question q:

$$com(q_i, r_{ij}) = \alpha_0 + \alpha_1 \cdot rel(q_i, r_{ij}) + \alpha_2 \cdot cov(r_{ij}) + \alpha_2 \cdot ori(r_{ij})$$

Where rel is the relevance factor, cov is the coverage factor, and ori is the originality factor.

Using the combined score, a quality score $qua(q_i, r_{ij})$ (e.g., interaction weighting involving the question q and the response r) may be produced by introducing the combined score into the following equation:

$$qua(q_i, r_{ij}) = \frac{1}{1 + \exp(-com(q_i, r_{ij}))}$$

In some implementations, the $\alpha$ coefficients can be learned using any standard learned coefficients algorithm.

EXAMPLE

Computing User Credential Scores

Based upon a user activity graph generated as an affinity matrix A, where each element $A(u_i, u_j)$ contains the sum of edge weights from the user $u_i$ to the user $u_j$, contributiveness scores $\vec{h}$ and authority scores $\vec{a}$ can be iteratively calculated, beginning with a random initial value for both $\vec{h}$ and $\vec{a}$.

$$\vec{h}^{(n+1)} = \epsilon \vec{1} + (1-\epsilon) A_{col} \vec{a}^{(n)}$$

$$\vec{a}^{(n+1)} = \epsilon \vec{1} + (1-\epsilon) A^T_{row} \vec{h}^{(n)},$$

where $\vec{1}$ is the vector of all ones, $A_{row}$ is the same as A with its rows normalized to sum to one, $A_{col}$ is A with its columns normalized to sum to one, and $\epsilon$ is a reset probability to guarantee the convergence of the algorithm. The algorithm iterates until the following convergence conditions are satisfied:

$$\|\vec{h}^{(n+1)} - \vec{h}^{(n)}\|_2 \le l$$

$$\|\vec{a}^{(n+1)} - \vec{a}^{(n)}\|_2 \le l,$$

where l is a predefined threshold.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying, by operation of a computer system comprising one or more computers, a plurality of interactions between users through an electronic network, each interaction between a pair of users comprising a response by a first user for a content item contributed by a second user;
generating, by operation of the computer system, a user activity graph identifying links between users based on the plurality of interactions between users;
assigning a weighting factor to each interaction by operation of the system, wherein the weighting factor represents a quality of the interaction;
iteratively determining, by operation of the computer system, an authority score for each user, wherein the authority score represents a measurement of response quality for responses the user has provided for content items contributed by other users, and wherein the authority score for the user is based on contributiveness scores of users with whom the user is linked in the user activity graph, each contributiveness score scaled by the weighting factor for a respective interaction between the user and a linked user represented in the activity graph;
iteratively determining, by operation of the computer system, a contributiveness score for each user, wherein the contributiveness score represents a measurement of contribution quality for content items the user has contributed, and wherein the contributiveness score is based on authority scores of users with whom the user is linked in the user activity graph, each authority score scaled by the weighting factor for a respective interaction between the user and a linked user represented in the activity graph;
generating, by operation of the system, a user credential score for each of a plurality of users, wherein the user credential score is based on a combination of the authority score and the contributiveness score; and
storing each user credential score in association with a respective user identifier on a computer-readable storage device.

2. The method of claim 1, further comprising:
receiving a search query;
identifying by operation of the system user-generated content items responsive to the search query; and
ranking by operation of the system the identified user-generated content items based, at least in part, on the user credential scores associated with the items through the users identified as having generated the items.

3. The method of claim 2, wherein identifying user-generated content items responsive to the search query includes assigning a measure of content relevance for each item and ranking the user-generated content items based on the user credential scores includes combining the user credential scores associated with the items with the measures of content relevance for the items.

4. The method of claim 3, further comprising normalizing the user credential scores and the measures of content relevance, wherein combining the user credential scores associated with the items with the measures of content relevance for the items includes combining the normalized user credential scores with the normalized measures of content relevance.

5. The method of claim 1, wherein the authority scores and the contributiveness scores are generated by iterating an iterative updating process until the iterative updating process reaches a predetermined convergence threshold.

6. The method of claim 1, wherein the plurality of user interactions includes user-generated content on at least one of a question answering web site, a bulletin board web site, a blog, or a social networking web site.

7. The method of claim 1, wherein the weighting factor is derived by combining a plurality of quality factors, at least one of the quality factors selected from the group consisting of a relevance of a content item by one user to an associated prior content item by another user, an originality of a content item relative to other content items, a coverage of a content item corresponding to a measure of uncommon terms in the content item, a richness of the content item, and a timeliness of a content item.

8. The method of claim 1, further comprising rewarding users based on the user credential scores.

9. The method of claim 1, wherein the plurality of interactions include interactions between users in an electronic community.

10. A system for ranking users or user-generated content, comprising:
at least one server adapted to receive and publish user-generated content for access across a network;
at least one storage device storing user-generated content; and
at least one processor configured to:
identify interactions between pairs of users relating to the stored user-generated content, each interaction between a pair of users comprising a response by a first user for a content item contributed by a second user;
generate a user activity graph identifying links between users based on the interactions between pairs of users;
generate a weighting factor for each interaction based on an objective measure of quality of the interaction;
iteratively determine an authority score for each user, wherein the authority score represents a measurement of response quality for responses the user has provided for content items contributed by other users, and wherein the authority score for the user is based on contributiveness scores of users with whom the user is linked in the user activity graph, each contributiveness score scaled by the weighting factor for a respective interaction between the user and a linked user represented in the activity graph;
iteratively determine a contributiveness score for each user, wherein the contributiveness score represents a measurement of contribution quality for content items the user has contributed, and wherein the contributiveness score is based on authority scores of users with whom the user is linked in the user activity graph, each authority score scaled by the weighting factor for a respective interaction between the user and a linked user represented in the activity graph;

generate a user credential score for each user, wherein the user credential score is based on a combination of the authority score and the contributiveness score; and
ranking at least one of users or user-generated content based on the user credential scores.

11. The system of claim 10, wherein the at least one processor is configured to generate a user credential score for each user by iteratively updating an authority score and a related contributiveness score based on the identified interactions and the weighting factors.

12. The system of claim 11, wherein the at least one processor is further configured to:
receive a search query;
identify a plurality of user-generated content items in response to the search query;
rank the identified user-generated content items based, at least in part, on the user credential score for a user associated with each user-generated content item; and
generate a set of search results based on the ranking of content items.

13. The system of claim 12, wherein the at least one processor is configured to rank the identified user-generated content items based on a weighted combination of a measure of relevance associated with each user-generated content item and the user credential score for a user associated with each user-generated content item.

14. The system of claim 10, wherein the objective measure of quality of the interaction is derived from a combination of factors representing a relevance of a content item by one user to an associated prior content item by another user, an originality of a content item relative to other content items, and a coverage of uncommon terms in the content item.

15. The system of claim 10, wherein a particular one of the interactions includes an electronic response by a first user to electronic information posted by a second user, wherein the weighting factor for the particular interaction relates to at least one of a relevance of the electronic response by the first user to the electronic information posted by the second user, a coverage of relatively uncommon information in the electronic response, or a relative originality of the electronic response.

16. An electronic system for analyzing quality of content, the system comprising:
at least one server adapted to receive and publish content for access across a network;
at least one storage device storing user-generated content; and
means for generating a weighting factor for each of a plurality of interactions based on an objective measure of quality of the interaction, wherein each interaction occurs between a pair of users relating to the stored user-generated content, each interaction comprising a response by a first user for a content item contributed by a second user;
means for generating a user activity graph identifying links between users based on the plurality of interactions between users;
means for iteratively determining an authority score for each user, wherein the authority score represents a measurement of response quality for responses the user has provided for content items contributed by other users, and wherein the authority score for the user is based on contributiveness scores of users with whom the user is linked in the user activity graph, each contributiveness score scaled by the weighting factor for a respective interaction between the user and a linked user represented in the activity graph;
means for iteratively determining a contributiveness score for each user, wherein the contributiveness score represents a measurement of contribution quality for content items the user has contributed, and wherein the contributiveness score is based on authority scores of users with whom the user is linked in the user activity graph, each authority score scaled by the weighting factor for a respective interaction between the user and a linked user represented in the activity graph;
means for generating a user credential score for each user, wherein the user credential score is based on a combination of the authority score and the contributiveness score; and
means for ranking user-generated content based on the user credential scores of users that are associated with the content.

17. The system of claim 16, further comprising means for generating search results for a search of user-generated content based on a combination of the user credential scores and relevance scores for items of user-generated content.

18. An article comprising a computer-readable storage medium storing instructions operable to cause one or more processors to perform the following actions:
identifying a plurality of interactions between users through an electronic network, each interaction between a pair of users comprising a response by a first user for a content item contributed by a second user;
generating a user activity graph identifying links between users based on the plurality of interactions between users;
assigning a weighting factor to each interaction, wherein the weighting factor represents a quality of the interaction;
iteratively determining an authority score for each user, wherein the authority score represents a measurement of response quality for responses the user has provided for content items contributed by other users, and wherein the authority score for the user is based on contributiveness scores of users with whom the user is linked in the user activity graph, each contributiveness score scaled by the weighting factor for a respective interaction between the user and a linked user represented in the activity graph;
iteratively determining a contributiveness score for each user, wherein the contributiveness score represents a measurement of contribution quality for content items the user has contributed, and wherein the contributiveness score is based on authority scores of users with whom the user is linked in the user activity graph, each authority score scaled by the weighting factor for a respective interaction between the user and a linked user represented in the activity graph;
generating a user credential score for each of a plurality of users, wherein the user credential score is based on a combination of the authority score and the contributiveness score; and
storing the user credential scores on a computer-readable storage device.

19. The article of claim 18, wherein the computer-readable storage medium further stores instructions operable to cause one or more processors to perform the following additional actions:
receiving a search query;
identifying user-generated content items responsive to the search query; and ranking the identified user-generated content items based, at least in part, on the user credential scores associated with the items.

20. The article of claim 19, wherein identifying user-generated content items responsive to the search query includes assigning a measure of content relevance for each item and ranking the user-generated content items based on the user credential scores includes combining the user credential scores associated with the items with the measures of content relevance for the items.

* * * * *